United States Patent
Yamakita

(10) Patent No.: US 7,324,837 B2
(45) Date of Patent: Jan. 29, 2008

(54) BASE STATION APPARATUS OF WHICH INSTALLATION IS FACILITATED

(75) Inventor: Yoshinobu Yamakita, Moriguchi (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 69 days.

(21) Appl. No.: 10/787,139

(22) Filed: Feb. 27, 2004

(65) Prior Publication Data

US 2004/0185904 A1    Sep. 23, 2004

(30) Foreign Application Priority Data

Mar. 19, 2003   (JP)   ............................. 2003-075479

(51) Int. Cl.
    *H04B 1/38*   (2006.01)
(52) U.S. Cl. ................... 455/561; 455/562.1
(58) Field of Classification Search ............ 455/562.1, 455/277.1, 78, 38; 342/378; 370/334
    See application file for complete search history.

(56) References Cited

U.S. PATENT DOCUMENTS

| | | | |
|---|---|---|---|
| 6,226,275 B1* | 5/2001 | Yang et al. ................. | 370/280 |
| 6,385,464 B1* | 5/2002 | Narita et al. ................ | 455/561 |
| 6,397,083 B2* | 5/2002 | Martin et al. ............. | 455/562.1 |
| 6,600,935 B1* | 7/2003 | Hiramatsu ............... | 455/562.1 |
| 2001/0016504 A1* | 8/2001 | Dam et al. .................. | 455/562 |
| 2002/0054580 A1* | 5/2002 | Strich et al. ................ | 370/334 |
| 2002/0190902 A1* | 12/2002 | Samson et al. ............ | 342/418 |
| 2003/0232633 A1* | 12/2003 | Iida et al. ................ | 455/575.7 |
| 2004/0114535 A1* | 6/2004 | Hoffmann et al. .......... | 370/252 |
| 2005/0070333 A1* | 3/2005 | Doi .......................... | 455/562.1 |

FOREIGN PATENT DOCUMENTS

| | | |
|---|---|---|
| JP | 10-041873 | 2/1998 |
| JP | 11-261474 | 9/1999 |

* cited by examiner

*Primary Examiner*—Duc M. Nguyen
*Assistant Examiner*—Wayne Cai
(74) *Attorney, Agent, or Firm*—Foley & Lardner LLP

(57) ABSTRACT

Even if random connection to eight connectors at a base station is established when eight antennas are connected to the base station, a connection relation optimal for reception with a diversity system or with adaptive array processing can subsequently be established through switching by means of an antenna switching unit. A control circuit causes a test radio wave transmission circuit to transmit a radio wave from any one antenna, and levels of the radio waves received at remaining antennas are analyzed. In this manner, relative connection relation among connected antennas is found. Based on this analysis result, an antenna selection control circuit controls the antenna switching unit for reconnection of the antennas. Thus, a base station apparatus that is readily installed and achieves excellent work efficiency can be provided.

6 Claims, 13 Drawing Sheets

FIG.7

| | | RECEPTION | | | | | | | |
|---|---|---|---|---|---|---|---|---|---|
| | | CONNECTOR CON1 | CONNECTOR CON2 | CONNECTOR CON3 | CONNECTOR CON4 | CONNECTOR CON5 | CONNECTOR CON6 | CONNECTOR CON7 | CONNECTOR CON8 |
| TRANSMISSION | CONNECTOR CON1 | | 100 | 30 | 17 | 100 | 17 | 30 | 15 |
| | CONNECTOR CON2 | 100 | | 17 | 30 | 17 | 15 | 100 | 17 |
| | CONNECTOR CON3 | 30 | 17 | | 17 | 100 | 100 | 15 | 30 |
| | CONNECTOR CON4 | 17 | 30 | 17 | | 15 | 30 | 100 | 100 |
| | CONNECTOR CON5 | 100 | 17 | 100 | 15 | | 30 | 17 | 17 |
| | CONNECTOR CON6 | 17 | 15 | 100 | 30 | 30 | | 17 | 100 |
| | CONNECTOR CON7 | 30 | 100 | 15 | 100 | 17 | 17 | | 30 |
| | CONNECTOR CON8 | 15 | 17 | 30 | 100 | 17 | 100 | 30 | |

\# DATA ATTAINING MAXIMUM RECEPTION LEVEL AMONG DATA RECEIVED AT EACH ANTENNA IS ASSUMED AS 100.

BASE STATION APPARATUS OF WHICH INSTALLATION IS FACILITATED

BACKGROUND OF THE INVENTION

1. Field of the Invention

The present invention relates to a base station apparatus used in mobile communication.

2. Description of the Background Art

Generally, for efficient use of radio waves, a cellular system is employed in mobile communication such as in a portable phone system or PHS (Personal Handyphone System). That is, a large number of base stations adapted to a number of cells are required.

In addition, in recent days, a diversity reception system or adaptive array processing is employed. In such a diversity reception system or adaptive array processing, a plurality of antennas are used in each base station, which are installed according to a prescribed arrangement, for example, on a circumference. With the diversity reception system or adaptive array processing, improvement of gain, elimination of interference, or improvement in efficiency in utilizing radio waves is achieved.

In an antenna installation work at a base station requiring such a plurality of antennas, cables from the plurality of antennas should be connected to a main body of a base station apparatus. The number of antenna cables that should be connected to the main body of the base station apparatus corresponds to the number of the antenna elements, and further, the base station apparatus is located distant from the antennas. Accordingly, the connection work tends to be difficult to some extent.

FIG. 11 illustrates the work for connection between the antennas and the base station apparatus main body.

Referring to FIG. 11, antennas ANT1 to ANT8 arranged on a circumference are provided at an upper end of a post P. A box B is provided at a lower portion of post P, in which a base station apparatus is housed. Antennas ANT1 to ANT8 are connected to the base station apparatus via cables CB1 to CB8 respectively.

FIG. 12 is a block diagram showing a configuration of a conventional base station apparatus 501.

Referring to FIG. 12, base station apparatus 501 includes a first radio transmission/reception circuit 503 performing transmission/reception using antennas ANT1, ANT3, ANT5, ANT7 and a second radio transmission/reception circuit 506 performing transmission/reception using antennas ANT2, ANT4, ANT6, ANT8.

Base station apparatus 501 further includes a first digital signal processing circuit 504 provided corresponding to radio transmission/reception circuit 503, a second digital signal processing circuit 504 provided corresponding to radio transmission/reception circuit 506, a channel interface circuit 505 serving as an interface between digital signal processing circuits 504, 507 and communication network, and a control circuit 508 serving for overall control over each circuit in base station apparatus 501.

As shown in FIG. 12, in recent years, the base stations equipped with a plurality of radio transmission/reception circuits (tuners) are often used so that more users can establish communication in an area covered by one base station. The plurality of radio transmission/reception circuits use frequency channels different from each other in an identical frequency band.

The plurality of radio transmission/reception circuits may share an antenna. In such a case, however, a circuit which combines radio waves emitted from a plurality of radio transmission/reception units for transmission to an antenna is required in the base station apparatus. Accordingly, the base station apparatus main body will become expensive.

For example, in accordance with frequency of use by users, a base station equipped with a plurality of radio transmission/reception circuits may be adopted in an urban area, while a base station equipped with a single radio transmission/reception circuit may be adopted in a suburban or mountain area. In such a case, it is more convenient to provide antennas separately for each radio transmission/reception circuit, because a component for the radio transmission/reception circuit can be shared.

FIG. 13 illustrates an example of connection between the antennas shown in FIG. 11 and the base station apparatus shown in FIG. 12.

Referring to FIG. 13, in diversity reception for example, reception is preferably achieved using two antennas located distant from each other, instead of using two antennas proximate to each other. From such a point of view, for example, antennas are preferably arranged in a group G1 and a group G2 corresponding to two tuners respectively.

For example, if antennas ANT1 and ANT2 are allocated to one tuner, the antennas are arranged proximate to each other in terms of space. Therefore, if communication is affected by a neighboring building or the like, reception status at both antennas ANT1 and ANT2 predictably becomes poor. When reception at antenna ANT1 is poor, reception at antenna ANT5 should be enabled. In other words, in allocating antennas to one tuner, antennas are preferably arranged in a distributed manner, instead of allocating antennas proximate to each other like a cluster.

It is noted that Japanese Patent Laying-Open No. 10-41873 provides description on an installation work of a base station apparatus.

On the other hand, in a conventional base station shown in FIGS. 11 and 12, a plurality of cables should be connected to connectors of the base station in a preferred connection relation as shown in FIG. 13 during an antenna installation work. In doing so, labels indicating such a preferred connection relation with antennas should be provided at end portions of cables on the side to be connected to the connectors of the base station. Even with such labels, misconnection may take place during the work. In such a case, maximum performance of the base station apparatus cannot be exhibited.

SUMMARY OF THE INVENTION

An object of the present invention is to provide a base station apparatus achieving improvement in efficiency in an installation work.

In summary, according to the present invention, a base station apparatus includes: a plurality of connectors used for connection to a plurality of antennas respectively; a plurality of transmission/reception circuits performing transmission/reception using the plurality of antennas; and an antenna switching unit provided between the plurality of connectors and the plurality of transmission/reception circuits and modifying connection relation between the plurality of connectors and the plurality of transmission/reception circuits.

Preferably, the plurality of antennas are divided into a plurality of groups, the number of which is equal to the number of the plurality of transmission/reception circuits. The base station apparatus further includes a control unit. When the antenna switching unit is at a initial state, the control unit obtains properties of the plurality of antennas via the plurality of connectors, determines to which of the plurality of groups each of the plurality of antennas should belong, based on the obtained properties, and causes a state of the antenna switching unit to make a transition from the initial state to a use state suitable for use.

More preferably, the control unit includes a transmission circuit transmitting a test radio wave using one of the plurality of antennas connected to one of the plurality of connectors as a transmission antenna, a reception circuit receiving the test radio wave using antennas other than the transmission antenna among the plurality of antennas as a reception antenna, a recording circuit extracting and recording information from reception signals of the test radio waves for each of the plurality of antennas from the reception circuit, a selection control circuit giving an instruction to the antenna switching unit to sequentially switch a connector to be connected to the transmission circuit among the plurality of connectors, and a control circuit presuming antenna arrangement from the information recorded on the recording circuit and determining setting for the use state of the antenna switching unit.

More preferably, the plurality of antennas are connected to a plurality of elements respectively, which have properties different from each other, corresponding to arrangement positions. The control unit includes a measurement circuit measuring a property of each of the plurality of elements via the plurality of connectors, and a control circuit presuming antenna arrangement based on a measurement result of the measurement circuit and determining setting for the use state of the antenna switching unit.

More preferably, the plurality of elements are resistance elements.

In this manner, a primary advantage of the present invention is that subsequent modification for suitable connection can be made even if a cable for an antenna is once connected to a connector of a base station in an arbitrary connection relation. Working efficiency can thus be improved. In addition, performance of a base station apparatus can sufficiently be exhibited.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows one example of a table created at step S12.

DESCRIPTION OF THE PREFERRED EMBODIMENTS

Figure 1:
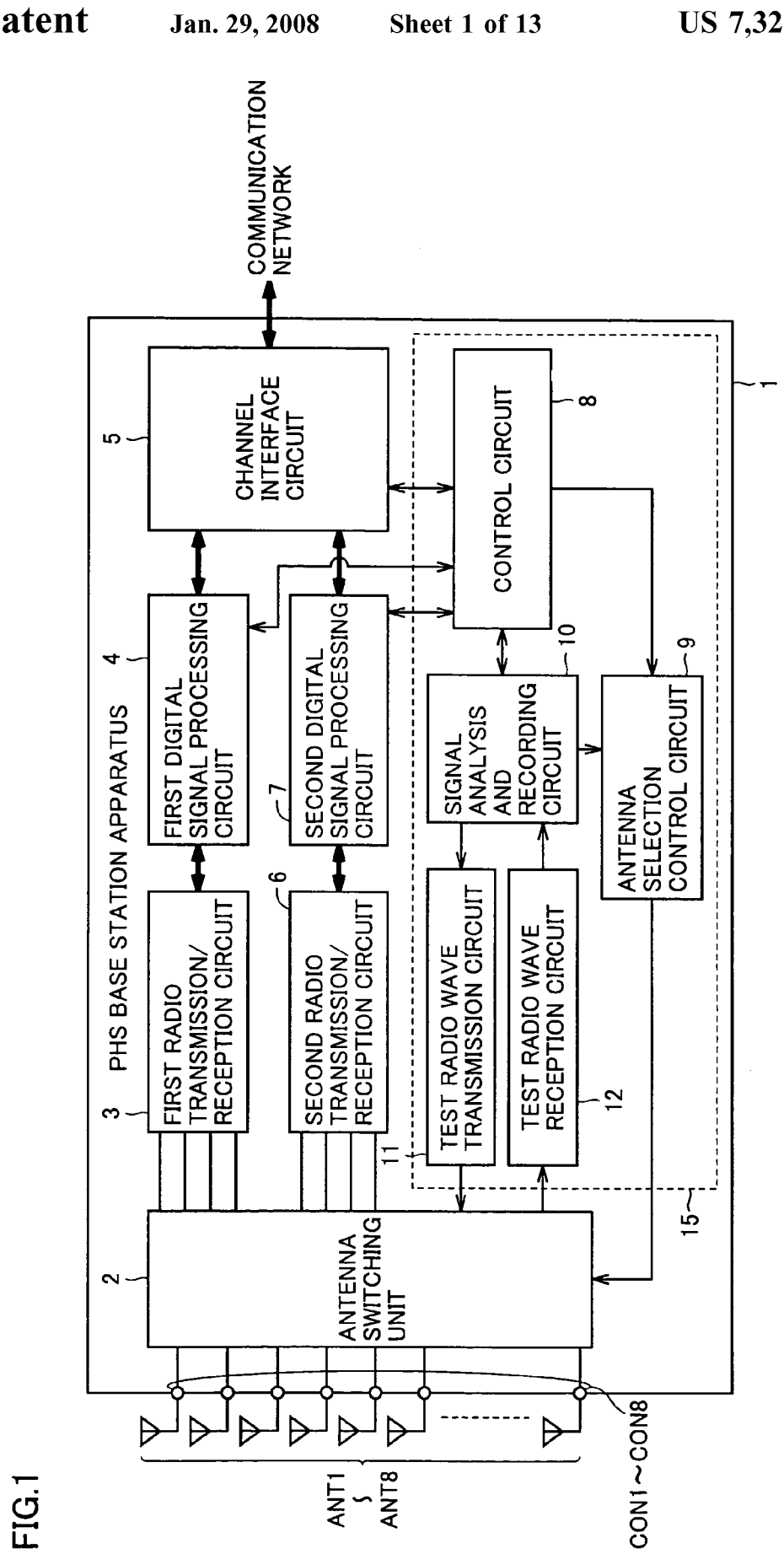
FIG. 1 is a block diagram showing a configuration of a base station apparatus 1 in the first embodiment.

In the following, embodiments of the present invention will be described in detail with reference to the figures. It is noted that the same reference characters refer to the same or corresponding components in the figures.

In the embodiments below, a PHS base station apparatus representing a communication apparatus will exemplary be described.

First Embodiment

FIG. 1 is a block diagram showing a configuration of a base station apparatus 1 in the first embodiment.

Referring to FIG. 1, base station apparatus 1 includes eight antennas ANT1 to ANT8 establishing wireless connection with a mobile terminal, an antenna switching unit 2 switching signal connection between antennas ANT1 to ANT8 and inner circuits in the base station, radio transmission/reception circuits 3, 6 performing radio signal processing such as amplification, frequency conversion or modulation/demodulation of radio signals from antennas connected by antenna switching unit 2, digital signal processing circuits 4, 7 provided corresponding to radio transmission/reception circuits 3, 6 respectively and digitally processing a transmission/reception signal at a baseband level, and a channel interface circuit 5 provided between digital signal processing circuits 4, 7 and communication network and transmitting/receiving data by establishing call connection.

Base station apparatus 1 further includes a test radio wave transmission circuit 11 transmitting a test radio wave in an antenna installation work, a test radio wave reception circuit 12 receiving the radio wave transmitted from test radio wave transmission circuit 11 via antennas ANT1 to ANT8, a signal analysis and recording circuit 10 analyzing and recording levels of reception signals from test radio wave reception circuit 12, an antenna selection control circuit 9 controlling a connection manner in antenna switching unit 2 based on an analysis result from signal analysis and recording circuit 10, and a control circuit 8 connected to functional blocks within base station apparatus 1 and serving for overall comprehensive control.

Test radio wave transmission circuit 11, test radio wave reception circuit 12, signal analysis and recording circuit 10, antenna selection control circuit 9, and control circuit 8 together operate as a control unit 15. When antenna switching unit 2 is at an initial state, control unit 15 obtains properties of a plurality of antennas ANT1 to ANT8 via a plurality of connectors CON1 to CON8 connected to the antennas. Then, based on the obtained properties, control unit 15 determines to which one of two groups corresponding respectively to radio transmission/reception circuits 3, 6 each of the plurality of antennas ANT1 to ANT8 connected to the plurality of connectors CON1 to CON8 respectively should belong, and causes the state of antenna switching unit 2 to make a transition from the initial state to a use state suitable for use.

Figure 2:
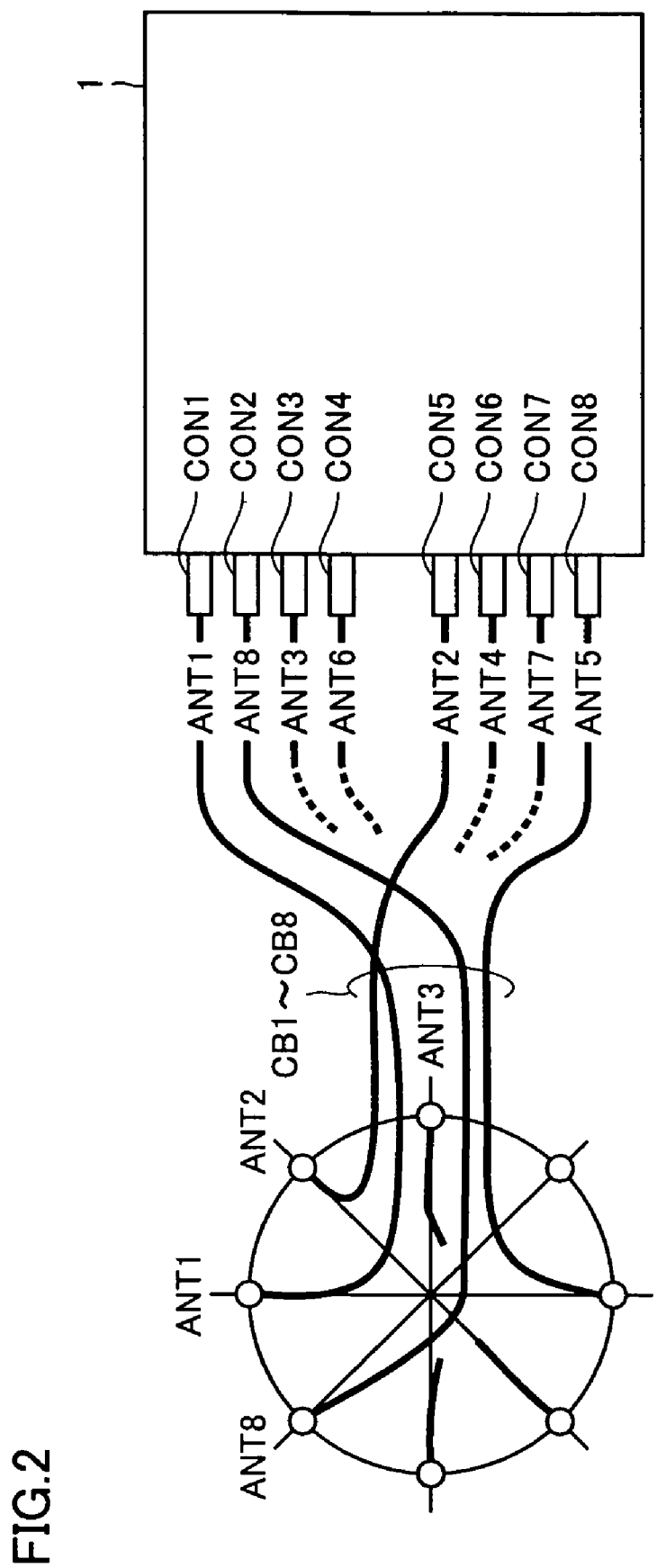
FIG. 2 illustrates an example in which antennas are connected during an installation work of a PHS base station apparatus according to the present invention.

FIG. 2 illustrates an example in which the antennas are connected during the installation work of a PHS base station apparatus according to the present invention.

Referring to FIGS. 1 and 2, an installation work will be described. Here, it is assumed that installation and connection of the base station apparatus main body, antennas, power supply facilities such as a breaker, communication line facilities such as a protector has been completed. Eight antennas ANT1 to ANT8 are connected to base station apparatus 1 via cable CB1 to CB8.

Though antennas ANT1 to ANT8 are connected to connectors CON1 to CON8 on one-to-one basis, to which connector each antenna is connected is not known. Description will be given starting from such a state in which mechanical installation or connection has been completed.

Initially, when the power of the base station apparatus is turned on, control circuit 8 attempts to establish connection to a not-shown center apparatus connected to the communication network via channel interface circuit 5, so as to perform processing required for opening communication lines, such as establishment of synchronization with the communication network or protocol check.

Then, when setting of the communication line is checked, control circuit 8 issues an instruction to digital signal processing circuits 4, 7 to turn on radio transmission/reception circuits 3, 6. Control circuit 8 then checks radio wave status around the base station. If a base station during operation is found in the vicinity, control circuit 8 establishes synchronization of a radio communication timing, using a radio wave emission timing of that base station as a reference.

Here, connection of antennas ANT1 to ANT8 to radio transmission/reception circuits 3, 6 is at the initial state. At the initial state, in antenna switching unit 2, antenna connectors CON1, CON2, CON3, CON4 at the base station shown in FIG. 2 are connected to radio transmission/reception circuit 3 shown in FIG. 1, while antenna connectors, CON5, CON6, CON7, CON8 are connected to radio transmission/reception circuit 6.

In the installation work of the base station, however, antennas ANT1 to ANT8 are randomly connected to antenna connectors CON1 to CON8 at the base station, resulting in random connection relation between the antennas and radio transmission/reception circuits 3, 6. It is noted that random connection does not affect an operation for reception for the purpose of checking synchronization, where antennas do not need to be identified.

As a result of the installation work described above, preparation for operation is completed except for a connection relation between the antennas and radio transmission/reception circuits 3, 6. On the other hand, since the antennas are randomly connected, spatially distributed, arrangement considered as ideal for improving wireless communication properties has not yet been optimized.

For example, ideally, positions of the antennas are spaced apart from each other for diversity reception. At the initial state, however, antennas allocated to radio transmission/reception circuit 3 may be arranged proximate to each other. Here, as a result of random connection during the antenna installation work, it is assumed that connectors CON1, CON2, CON3, CON4 are connected to antennas ANT1, ANT8, ANT3, ANT6 respectively, as shown in FIG. 2. In addition, it is also assumed that connectors CON5, CON6, CON7, CON8 are connected to antennas ANT2, ANT4, ANT7, ANT5 respectively. In a situation assumed as above, the base station apparatus according to the present invention presumes antenna arrangement and sets the antenna switching unit.

In the base station shown in FIG. 1, even if antennas ANT1 to ANT8 are randomly connected to connectors CON1 to CON8 of the base station, switching by means of antenna switching unit 2 can subsequently be performed so as to establish connection relation optimal for reception with the diversity system or with the adaptive array processing. Control circuit 8 causes test radio wave transmission circuit 11 to emit a radio wave from any one antenna, and the level of the radio wave received by remaining antennas is analyzed, whereby relative positional relation among connected antennas is found. Based on this analysis result, antenna selection control circuit 9 controls antenna switching unit 2 so as to reconnect the antennas.

Figure 3:
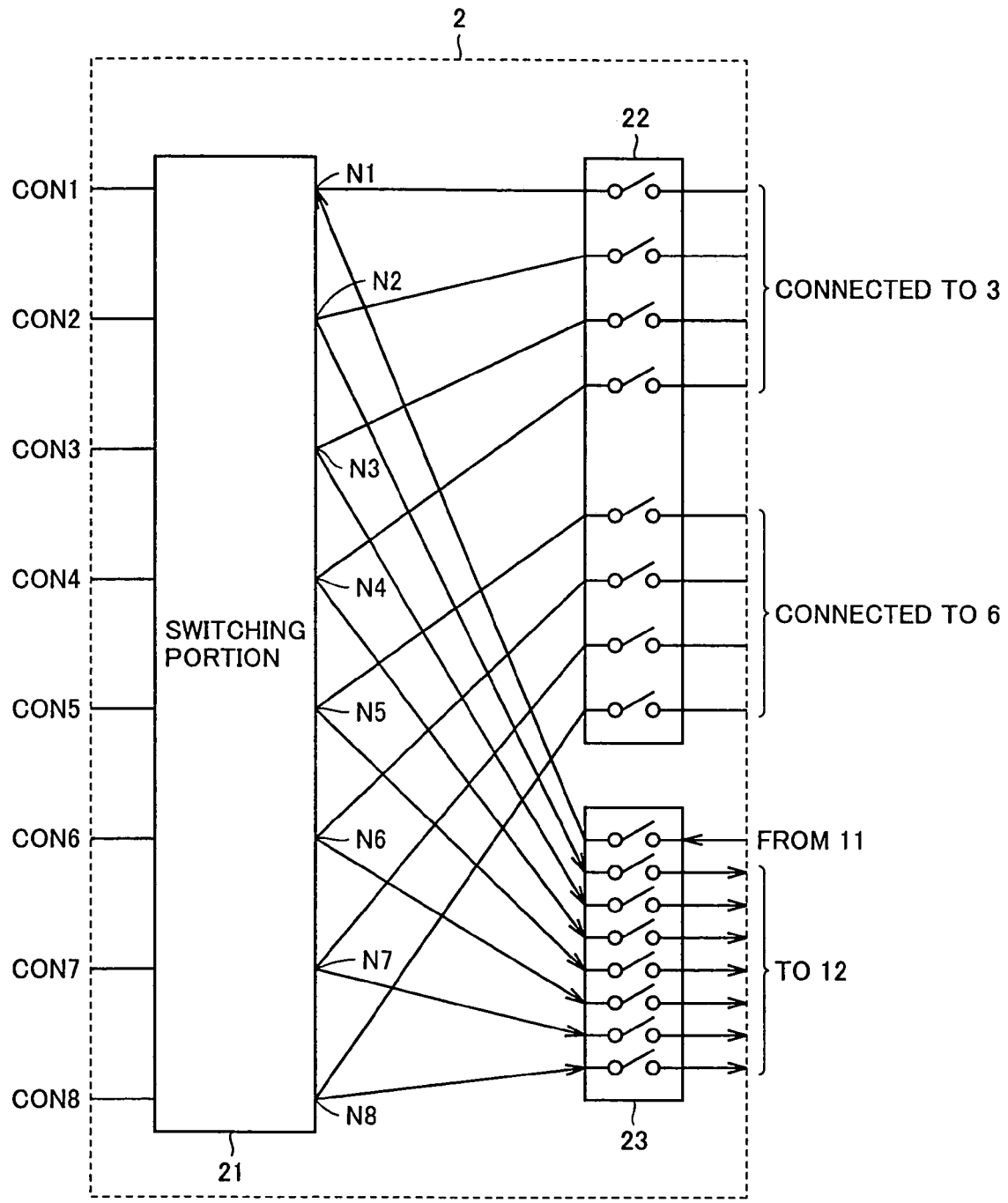
FIG. 3 shows a configuration within an antenna switching unit.

FIG. 3 shows a configuration within the antenna switching unit.

Referring to FIG. 3, antenna switching unit 2 includes a switching portion 21 provided with connectors for connection to the antennas, a connection switch 22 determining a connection relation between switching portion 21 and radio transmission/reception circuits 3, 6, and a connection switch 23 determining connection between switching portion 21 and test radio wave transmission circuit 11, test radio wave reception circuit 12.

Switching portion 21 can arbitrarily switch connection between connectors CON1 to CON8 and internal nodes N1 to N8. Connector CON1 will now be described as a representative example. Connector CON1 can be connected to any of internal nodes N1 to N8. More specifically, a switch capable of connecting one of internal nodes N1 to N8 to connector CON1 may be contained, or alternatively, one of eight switches for respective connection to internal nodes N1 to N8 may selectively be rendered conductive. Other connectors CON2 to CON8 have corresponding configuration similar to that of connector CON1.

Connection switch 22 includes four switches connecting internal nodes N1 to N4 to radio transmission/reception circuit 3 and four switches connecting internal nodes N5 to N8 to radio transmission/reception circuit 6.

Connection switch 23 includes a switch connecting internal node N1 to an output of test radio wave transmission circuit 11 and seven switches connecting internal nodes N2 to N8 to an input of test radio wave reception circuit 12.

Figure 4:
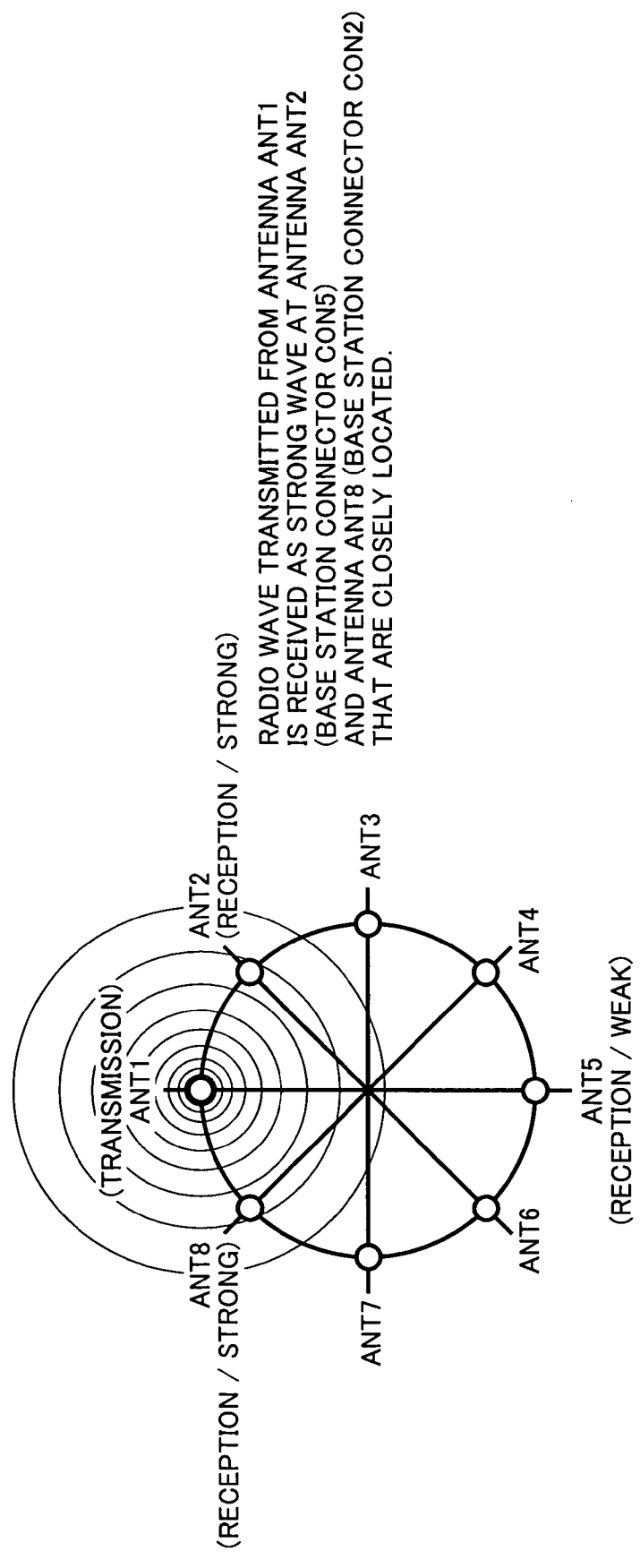
FIG. 4 illustrates transmission and reception of a test radio wave.

FIG. 4 illustrates transmission and reception of a test radio wave.

Referring to FIG. 4, according to the present invention, a radio wave is transmitted from one of antennas ANT1 to ANT8, and the transmitted test radio wave is received using remaining antennas. For example, the test radio wave transmitted from antenna ANT1 is received as strong wave at an antenna close to antenna ANT1, and received as weak wave at a distant antenna. Therefore, the test radio wave transmitted from antenna ANT1 is received as strong wave at antenna ANT2 (connected to base station connector CON5) and antenna ANT8 (connected to base station connector CON2).

Figure 5:
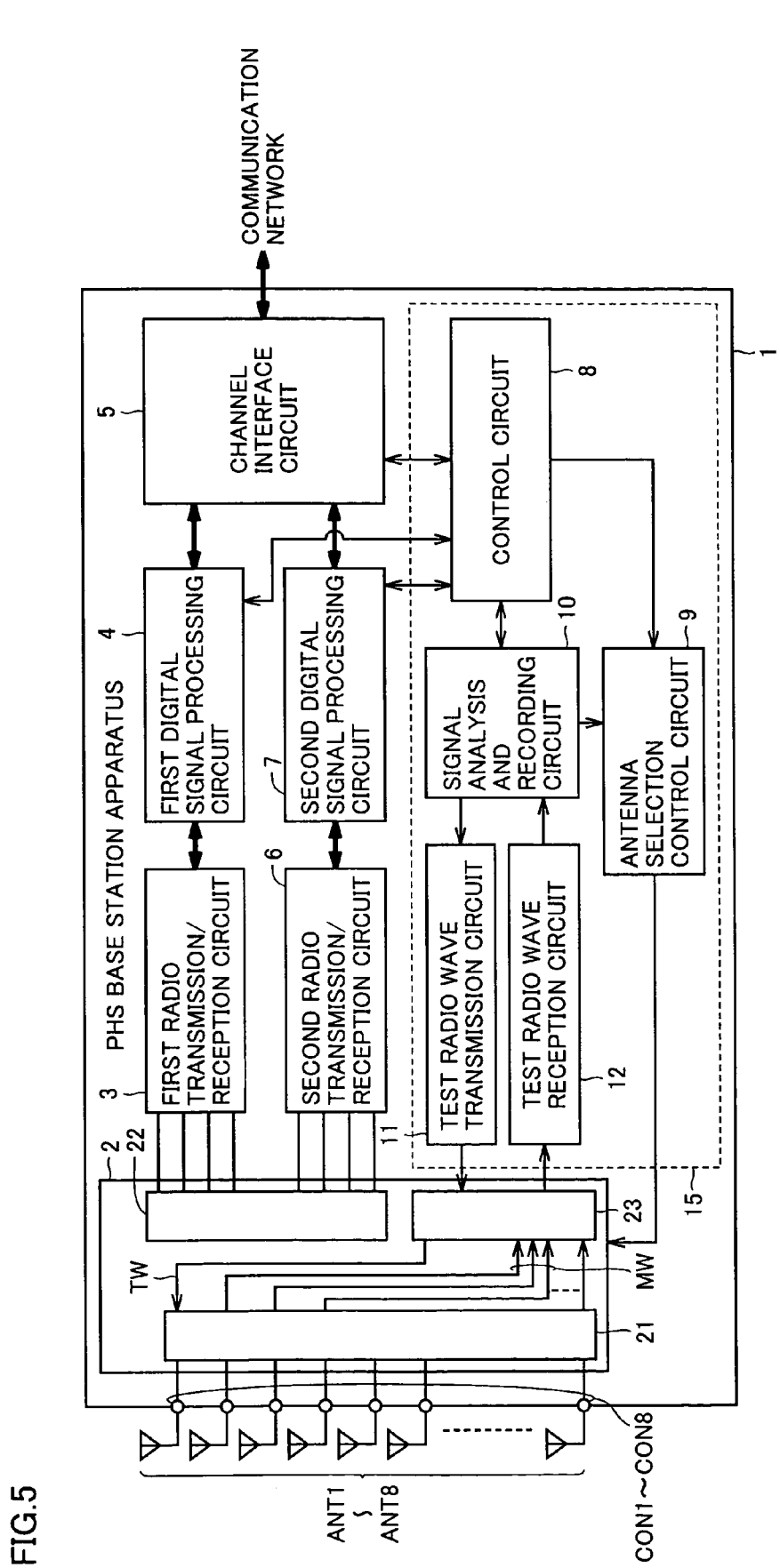
FIG. 5 shows a flow of a signal within an antenna switching unit 2 during a test.

FIG. 5 shows a flow of a signal within antenna switching unit 2 during a test.

Figure 6:
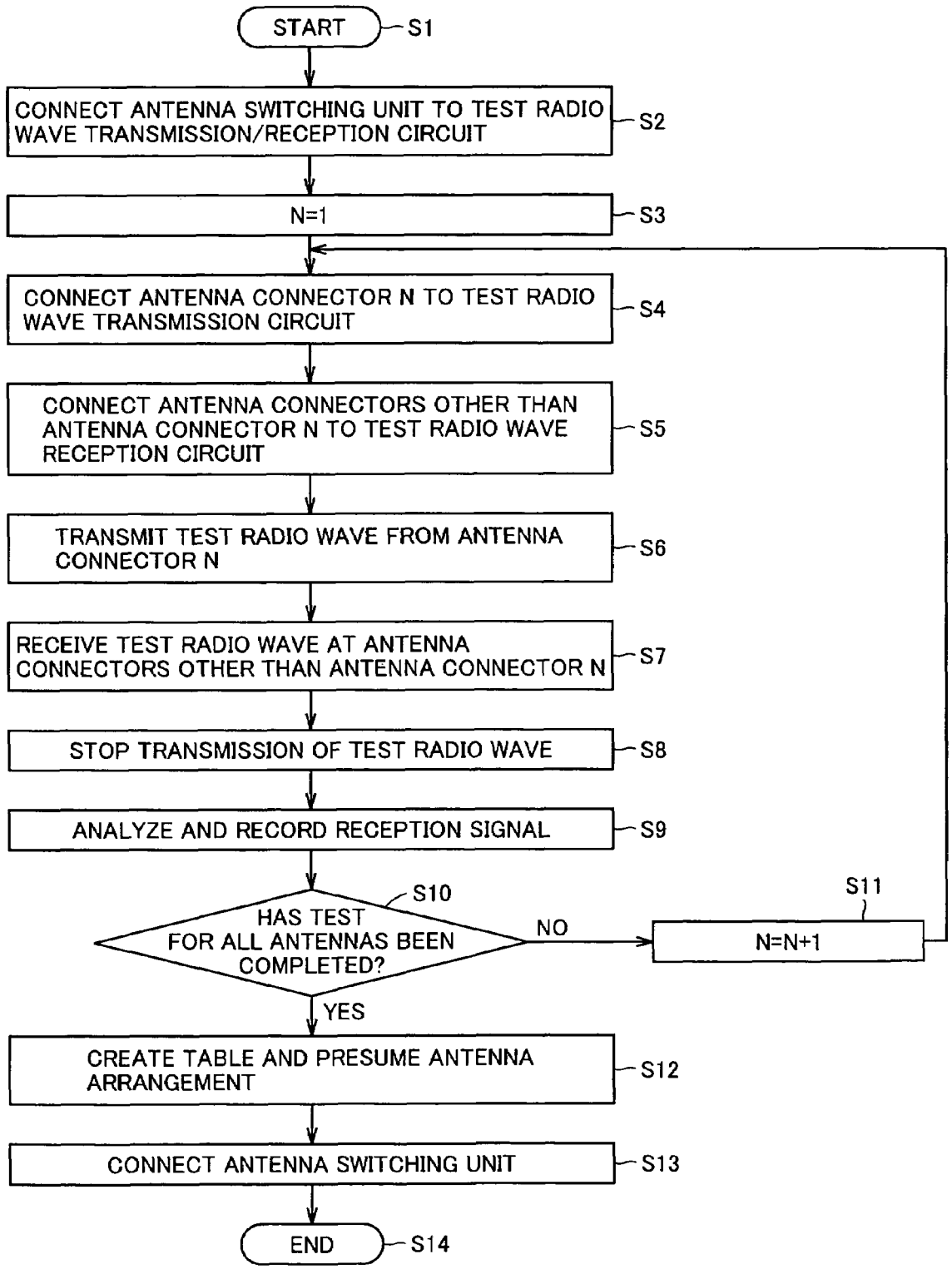
FIG. 6 is a flowchart illustrating an operation for presuming antenna arrangement and setting the antenna switching unit.

FIG. 6 is a flowchart illustrating an operation for presuming antenna arrangement and setting the antenna switching unit.

Referring to FIGS. 5 and 6, at step S1, an antenna switching operation is started from a state where mechanical installation or connection has been completed in the work.

At step S2, antenna switching unit 2 is set. Switches in connection switch 22 are all set to an open state, so that switching portion 21 is disconnected from radio transmission/reception circuits 3, 6. Meanwhile, switching portion 21 is connected to test radio wave transmission circuit 11 and test radio wave reception circuit 12 using connection switch 23. Thereafter, at step S3, N=1 is set as an initial value.

At step S4, an Nth antenna connector is connected to the test radio wave transmission circuit within switching portion 21. At step S5, antenna connectors other than the Nth antenna connector are connected to test radio wave reception circuit 12 within switching portion 21. Then, at step S6, a test radio wave is transmitted from the Nth antenna connector.

If N=1, connector CON1 is connected to node N1 in switching portion 21 shown in FIG. 5, and via this path, a signal from test radio wave transmission circuit 11 is transmitted from an antenna connected to the connector. Connectors CON2 to CON8 are connected to nodes N2 to N8 respectively in switching portion 21, and based on such connection, a reception path is formed.

The test radio wave transmitted from test radio wave transmission circuit 11 is weak. For example, a signal insignificant to a terminal in a range of radio wave inherently emitted by the PHS base station apparatus is extremely weakened and transmitted. Here, a transmission timing is synchronized with the previously established transmission timing of the base station in the vicinity.

Thereafter, at step S7, the test radio wave is received at antennas other than the antenna connected to the Nth antenna connector. When N=1 for example, the test radio wave transmitted from the antenna connected to connector CON1 is extremely weak. Therefore, the test radio wave is received as strong wave at an antenna close to the transmission antenna, and received as weak wave due to attenuation as the distance from the transmission antenna increases. Such reception can simultaneously be achieved if a plurality of reception units are provided in test radio wave reception circuit 12. If only a single reception unit is provided, sequential reception can be achieved by sequentially connecting switches in connection switch 23 to test radio wave reception circuit 12 on a one-by-one basis.

After reception is completed, transmission of the test radio wave from test radio wave transmission circuit 11 is stopped at step S8. Then, at step S9, the reception signal is analyzed and recorded in signal analysis and recording circuit 10. Signal analysis and recording circuit 10 records reception levels for each antenna, and notifies control circuit 8 of completion of the radio wave transmission test through the antenna connected to connector CON1.

In response, at step S10, whether or not the test for all antennas are completed is checked. If the test for all antennas has not been completed, the process proceeds to step S11 where N is incremented. When N is incremented and N is set to 2, antenna connector CON2 is connected to node N1 in switching portion 21, and connector CON1 is connected to node N2. Then, a radio wave is transmitted from connector CON2, and the test radio wave is received from connectors CON1, CON3 to CON8. In this manner, operations at steps S4 to S9 are repeated until the test for all antennas is completed.

When recording of the reception signals with respect to all antennas is completed, the process proceeds to step S12, where signal analysis and recording circuit 10 creates a table based on collected data and starts to presume antenna arrangement.

FIG. 7 shows one example of a table created at step S12.

In FIG. 7, data attaining maximum reception level among the data received at each antenna is assumed as 100. For example, the radio wave transmitted from connector CON1 is received with reception level 100 via connector CON2, while the radio wave transmitted from connector CON1 is received with reception level 30 via connector CON3.

In the example of the reception levels, transmission antenna connectors are shown in a vertical direction, while reception antenna connectors are shown in a horizontal direction. In FIG. 7, since the antenna number is not known in the base station, connectors are associated with each other using connector numbers.

A positional relation among antennas is presumed using the reception levels shown in FIG. 7. Initially, considering connector CON1 as a reference, the test radio wave transmitted from connector CON1 attains high reception level with respect to connector CON2 and connector CON5. Therefore, it is presumed that two antennas connected to connectors CON2, CON5 respectively are located next to the antenna connected to connector CON1.

Then, attention is paid to connector CON5 that has been presumed to be connected to the antenna next to the antenna connected to connector CON1. When the test radio wave is transmitted from connector CON5, reception levels via connector CON1 and connector CON3 are high. Therefore, three antennas connected to connectors CON1, CON5, CON3 are presumably arranged in this order.

Attention is now paid to connector CON3. When the test radio wave is transmitted from connector CON3, reception levels via connector CON5 and connector CON6 are high. Therefore, it can be presumed that connectors CON1, CON5, CON3, CON6 are arranged in this order. By repeating such a procedure, entire arrangement is presumed.

Figure 8:
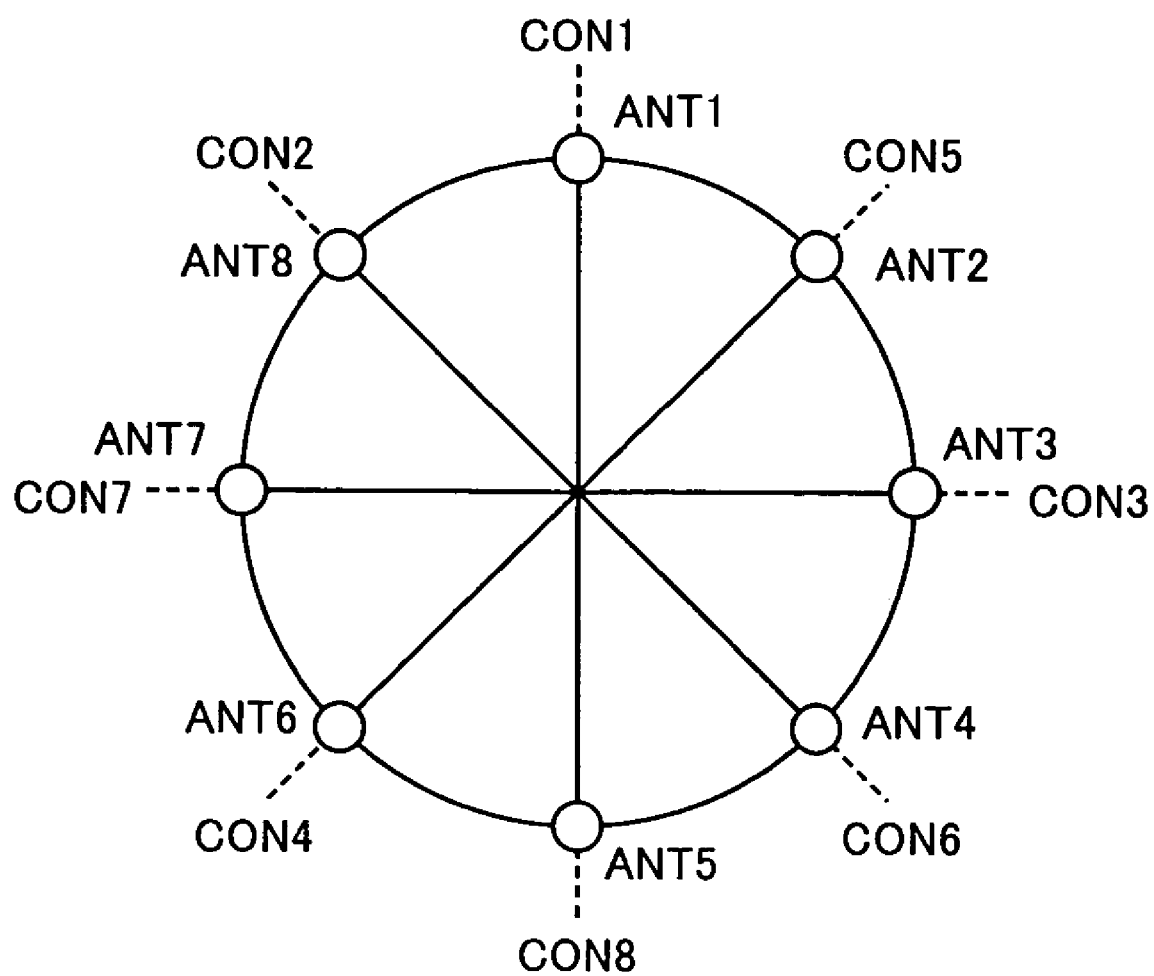
FIG. 8 shows an entire arrangement presumed from the example of reception levels shown in FIG. 7.

FIG. 8 shows the entire arrangement presumed from an example of reception levels shown in FIG. 7.

It has been presumed that antennas ANT1, ANT2, ANT3, ANT4 are connected to connectors CON1, CON5, CON3, CON6 respectively. It has also been presumed that antennas ANT5, ANT6, ANT7, ANT8 are connected to connectors CON8, CON4, CON7, CON2 respectively.

Referring again to FIG. 6, after the antenna arrangement is presumed, the process proceeds to step S13, where the antenna switching unit is connected.

Figure 9:
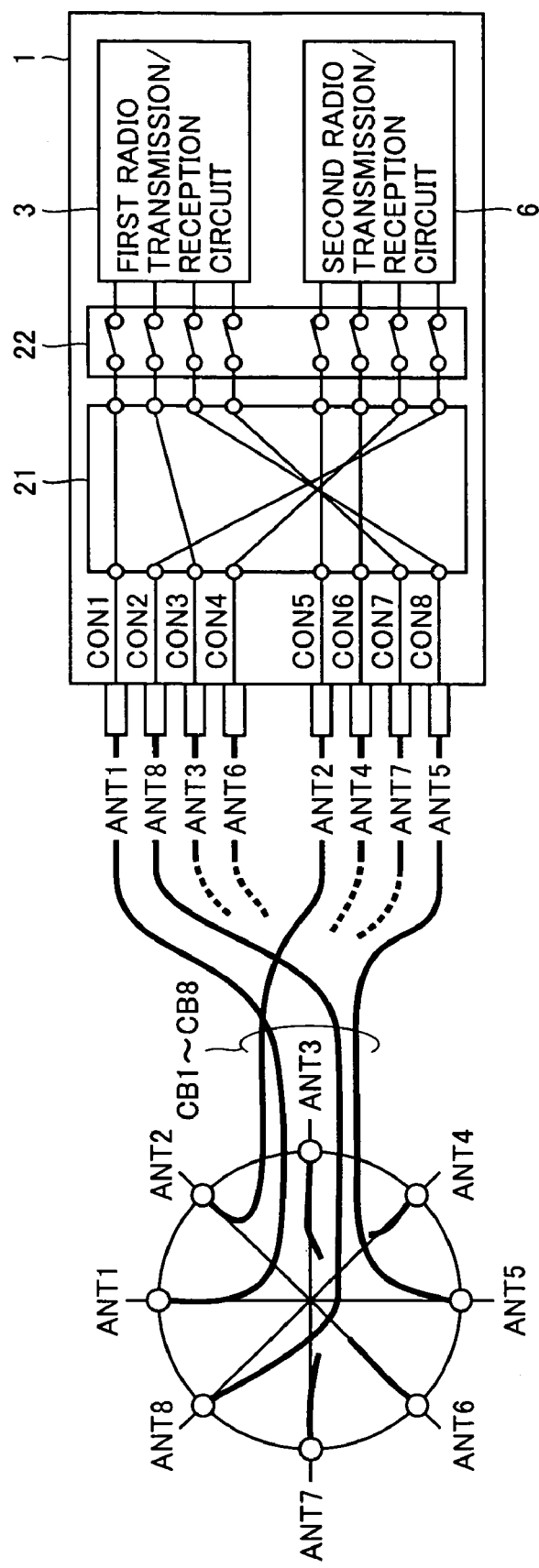
FIG. 9 illustrates connection of the antenna switching unit.

FIG. 9 illustrates connection of the antenna switching unit.

Referring to FIG. 9, based on the presumption result, connectors CON1, CON3, CON8, CON7 are connected to radio transmission/reception circuit 3 by means of switching portion 21 in antenna switching unit 2. Meanwhile, connectors CON5, CON6, CON4, CON2 are connected to radio transmission/reception circuit 6 by means of switching portion 21. After connection is switched as described above, switches in connection switch 22 are all set to a connected state. Though not shown, switches in connection switch 23 are all turned off, and test radio wave transmission circuit 11 and test radio wave reception circuit 12 are disconnected from connectors CON1 to CON8.

Figure 13:
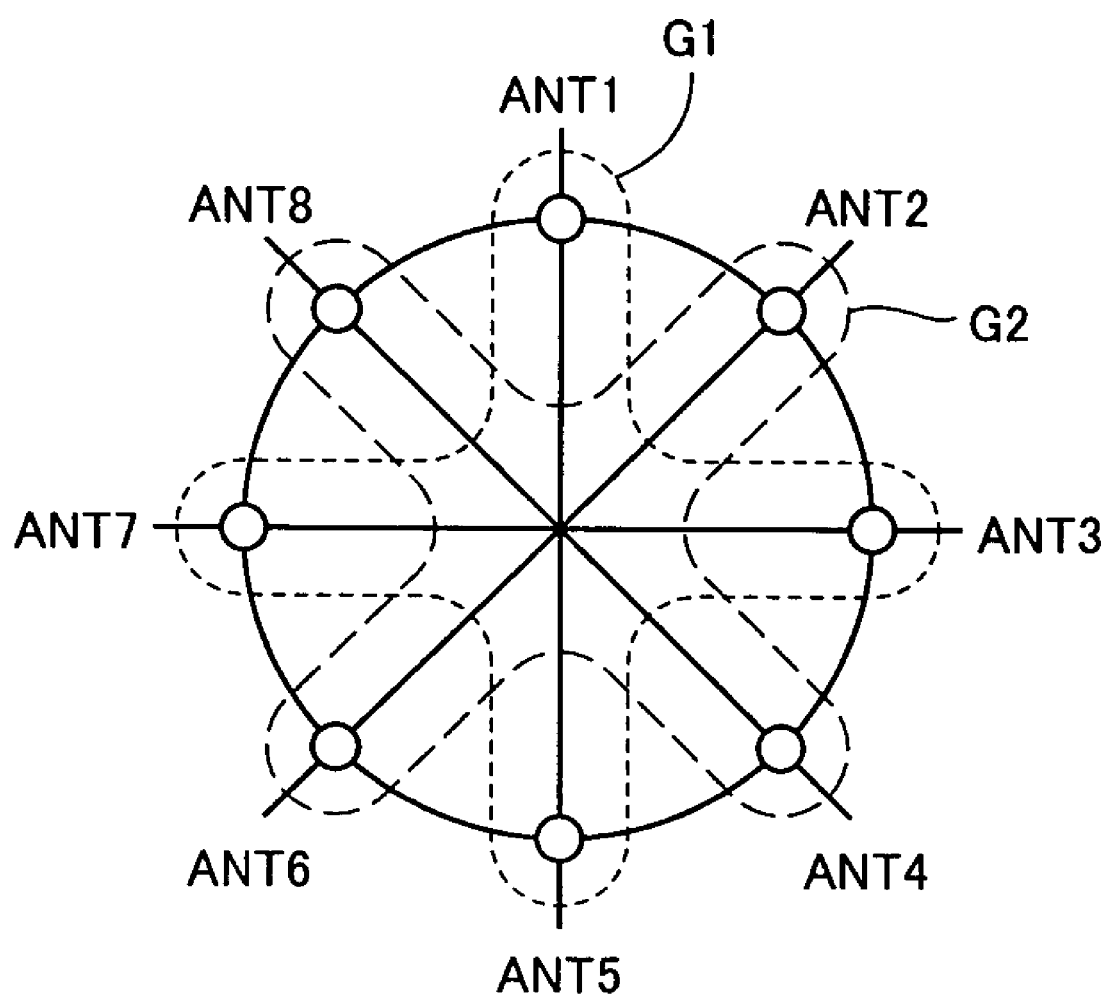
FIG. 13 illustrates an example of connection between the antennas shown in FIG. 11 and the base station apparatus shown in FIG. 12.

With such setting, antennas ANT1, ANT3, ANT5, ANT7 are ultimately connected to radio transmission/reception circuit 3, while antennas ANT2, ANT4, ANT6, ANT8 are connected to radio transmission/reception circuit 6. In this manner, grouping into groups G1 and G2 as described with reference to FIG. 13 is achieved.

Though a dedicated test radio wave transmission circuit or reception circuit has been configured for transmission/reception of the test radio wave in the description above, the present invention is not limited thereto. For example, either one or both of a radio transmission circuit and a radio reception circuit to be used in operation may be employed.

If reception from a plurality of antennas is attempted at an identical timing, the test radio wave reception circuit contains a plurality of reception circuits of which number corresponds to the number of the antennas. Alternatively, a similar effect can also be obtained with a reception method of sequentially switching antennas in one reception circuit.

As described above, the base station apparatus in the first embodiment obviates the necessity for strictly establishing connection relation of antennas with connectors at the time of work. Accordingly, the work is facilitated, and efficiency in the installation work of the base station is improved. Moreover, as appropriate connection is established by virtue of the antenna switching unit, performance of the base station apparatus can sufficiently be exhibited.

In addition, as connection is determined after the radio wave is actually output and received by the antenna, an ambient environment can also be reflected in connection.

Second Embodiment

In the second embodiment, an example in which antenna arrangement is presumed by measuring a resistance value will be described.

Figure 10:
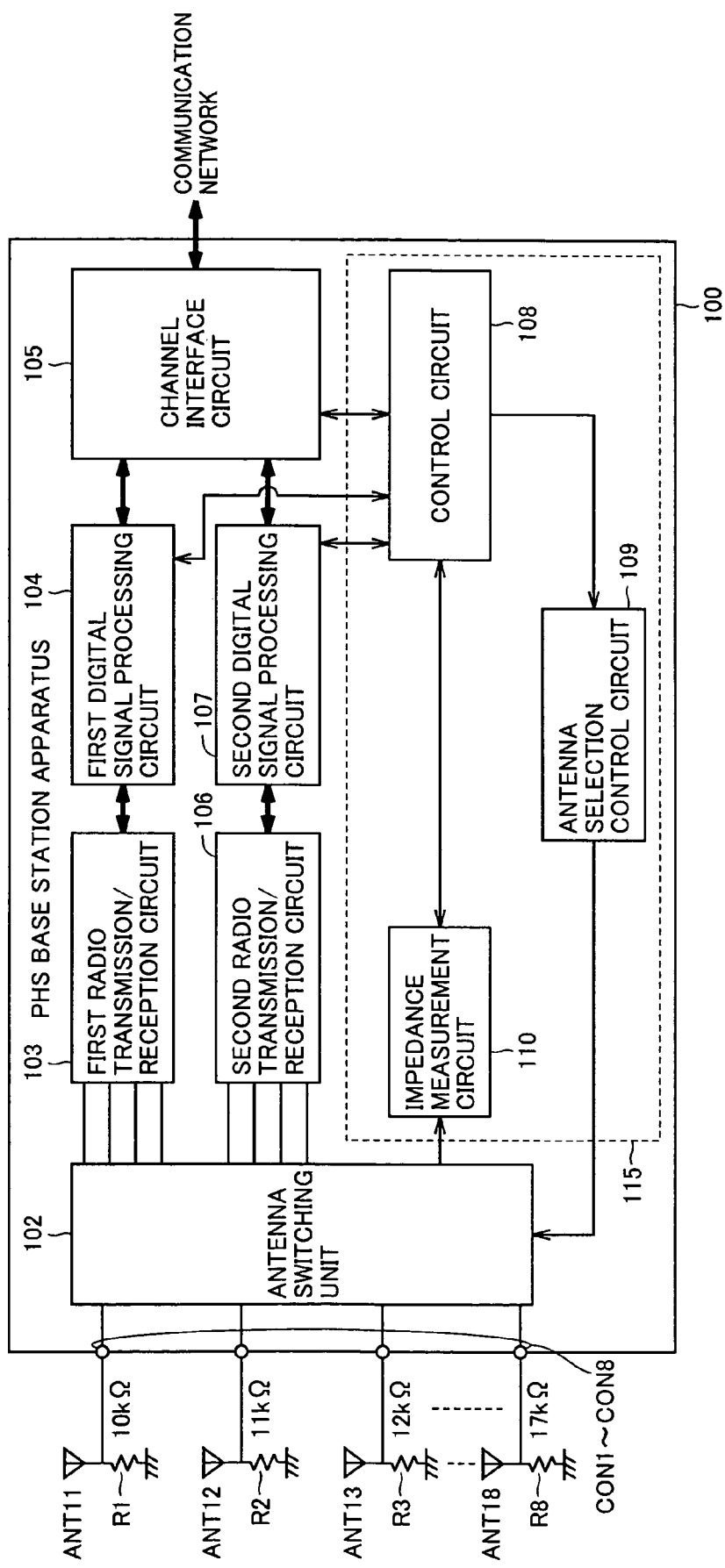
FIG. 10 is a block diagram showing a configuration of a base station apparatus 100 in the second embodiment.
Figure 11:
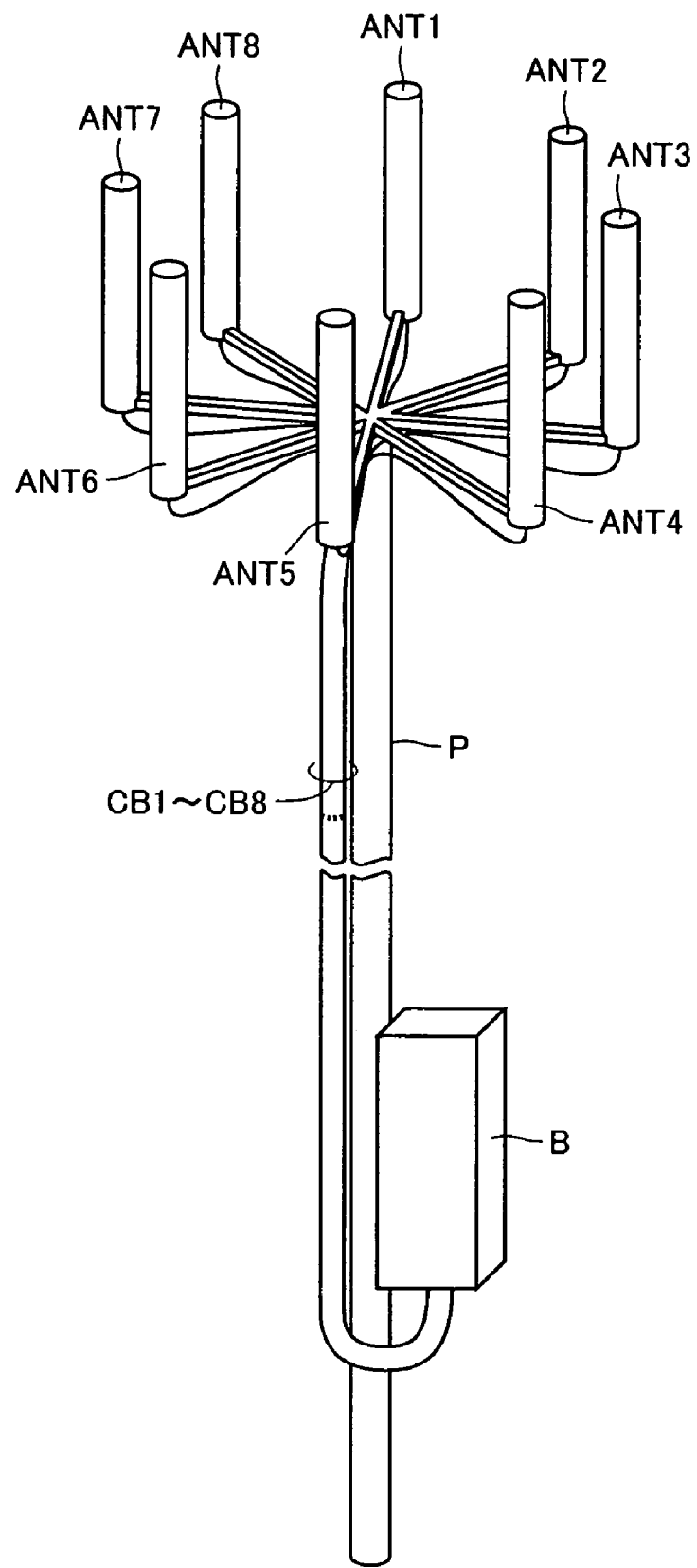
FIG. 11 is a diagram illustrating a work for connection between antennas and a base station apparatus main body.
Figure 12:
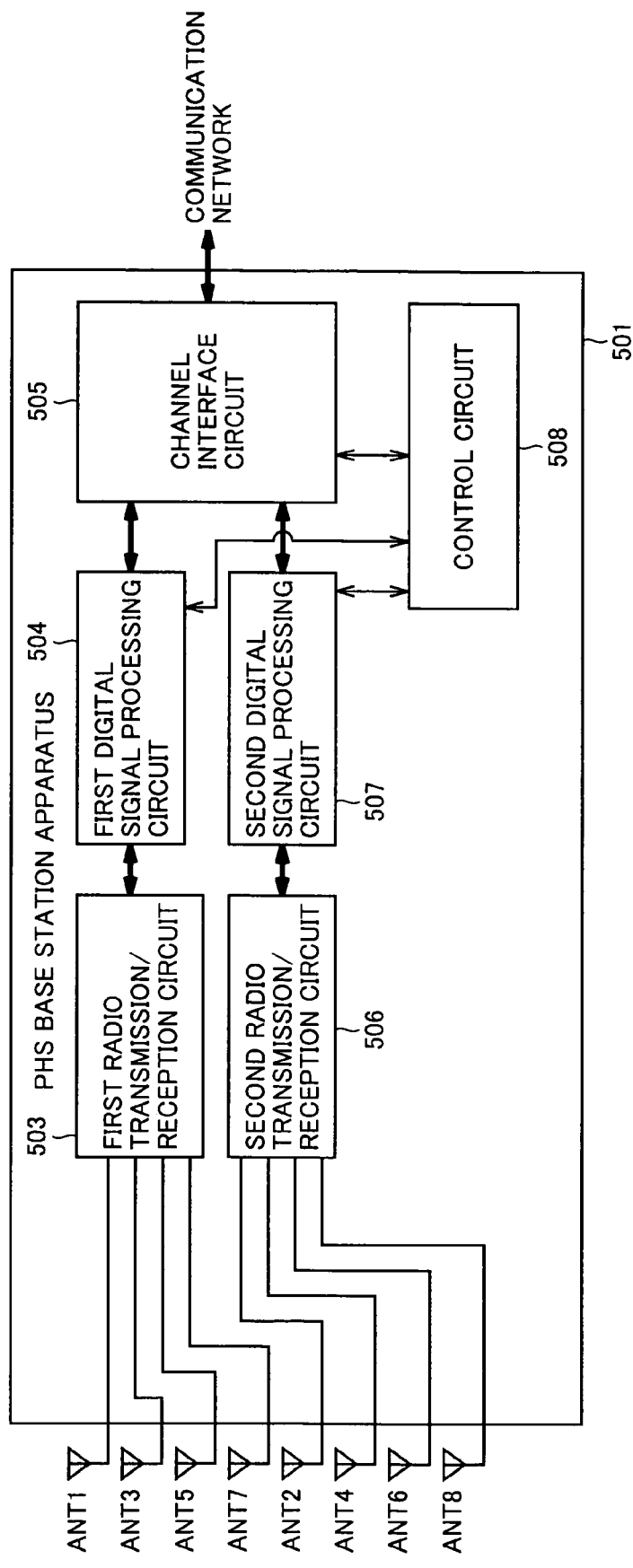
FIG. 12 is a block diagram showing a configuration of a conventional base station apparatus 501.

FIG. 10 is a block diagram showing a configuration of a base station apparatus 100 in the second embodiment.

Referring to FIG. 10, base station apparatus 100 includes eight antennas ANT11 to ANT18 establishing wireless connection with a mobile terminal, resistance elements R1 to R8 connected to antennas ANT11 to ANT18 respectively and having inherent resistance values with respect to the ground, an antenna switching unit 102 switching connection between the antennas and inner circuits in the base station, radio transmission/reception circuits 103, 106 connected to antennas ANT11 to ANT18 via the antenna switching unit and performing radio signal processing such as amplification, frequency conversion or modulation/demodulation of radio signals, digital signal processing circuits 104, 107 provided corresponding to radio transmission/reception circuits 103, 106 and digitally processing a transmission/reception signal at a baseband level, and a channel interface circuit 105 transmitting/receiving data by establishing call connection to communication network. Resistance elements R1, R2, R3, . . . , R8 have resistance values of 10 kΩ, 11 kΩ, 12 kΩ, . . . , 17 kΩ respectively. As the resistance values are sufficiently large, resistance elements R1 to R8 do not adversely affect radio wave transmission/reception.

Base station apparatus 100 further includes an impedance measurement circuit 110 measuring an impedance of the resistance element connected for each antenna in the antenna installation work, an antenna selection control circuit 109 controlling a connection manner in antenna switching unit 102 based on a measurement result from the impedance measurement circuit, and a control circuit 108 connected to functional blocks within base station apparatus 100 and serving for overall comprehensive control.

Impedance measurement circuit 110, antenna selection control circuit 109 and control circuit 108 together operate as a control unit 115. When antenna switching unit 102 is at an initial state, control unit 115 obtains properties, that is, impedances of a plurality of antennas ANT11 to ANT18, via a plurality of connectors CON1 to CON8 connected to the antennas. Then, based on the obtained properties, control unit 115 determines to which one of two groups corresponding respectively to radio transmission/reception circuits 103, 106 each of the plurality of antennas ANT11 to ANT18 connected to the plurality of connectors CON1 to CON8 respectively should belong, and causes the state of antenna switching unit 102 to make a transition from the initial state to a use state suitable for use.

An example in which the antennas are connected during the installation work of the PHS base station apparatus will now be described with reference to FIG. 10. It is noted that the work for the antennas is the same as in the first embodiment, and description thereof will not be repeated.

It is assumed that preparation for operation is completed except for an order of antenna element connection. Initially, control circuit 108 gives an instruction to antenna selection control circuit 109, and operates antenna switching unit 102 so that solely one of antenna connectors is connected to impedance measurement circuit 110.

When antenna connection is checked, impedance measurement circuit 110 measures an impedance of the antenna and informs control circuit 108 of the measured value. Then, in order to measure an impedance of a next connector, control circuit 108 operates antenna selection control circuit 109 so that a second connector is connected to impedance measurement circuit 110, followed by measurement of an impedance in a similar manner.

Control circuit 108 repeats such an operation as many times as the number of the antenna connectors, and obtains the impedance measurement values in the number corresponding to the number of antennas.

The impedance value for each antenna is specific to a position of an antenna base. Accordingly, by measuring the impedance value, to which portion on the antenna base an antenna is attached can be determined.

In this manner, control circuit 108 presumes an antenna position based on the impedance measurement value. Then, control circuit 108 controls antenna switching unit 102 via antenna selection control circuit 109, and sets antenna arrangement likely to achieve optimal radio communication performance, for example, the antenna arrangement as described with reference to FIG. 13.

In the second embodiment as well, even if connection relation between the plurality of antennas and connectors at the base station is not known at the time of the installation work, a plurality of radio transmission/reception units can subsequently be adapted to optimal antenna arrangement and reconnection can internally be allowed.

Here, antenna switching unit 102 can be configured in the following manner. In the configuration of antenna switching unit 2 described with reference to FIG. 3, a side of connection switch 23 to be connected to test radio wave transmission circuit 11 and test radio wave reception circuit 12 serves as a common node and is connected to impedance measurement circuit 110. Then, switches in connection switch 23 are sequentially rendered conductive on a one-by-one basis.

In the second embodiment as well, subsequent modification for suitable connection can be made even if a cable for an antenna is once connected to a connector of a base station in an arbitrary connection relation. Working efficiency can thus be improved. In addition, performance of a base station apparatus can sufficiently be exhibited.

Moreover, as the test radio wave for determining connection is not transmitted, the configuration can be simplified as compared with the base station apparatus in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A base station apparatus, comprising:
a plurality of connectors used for connection to a plurality of antennas respectively;
a plurality of transmission/reception circuits performing transmission/reception using said plurality of antennas; and
an antenna switching unit provided between said plurality of connectors and said plurality of transmission/reception circuits and modifying a connection relation between said plurality of connectors and said plurality of transmission/reception circuits, to correct an erroneous relationship between said plurality of antennas and said plurality of transmission/reception circuits, wherein said erroneous relationship occurred during installation work of said base station apparatus,
wherein
said plurality of antennas are divided into a plurality of groups, a number of which is equal to a number of said plurality of transmission/reception circuits,
said base station apparatus further comprises a control unit, and
when said antenna switching unit is at an initial state, said control unit obtains properties of said plurality of antennas via said plurality of connectors, determines to which of said plurality of groups each of said plurality of antennas should belong, based on said obtained properties, and causes a state of said antenna switching unit to make a transition from said initial state to a use state suitable for use.

2. The base station apparatus according to claim 1, wherein
said plurality of antennas are connected to a plurality of elements respectively, the plurality of elements having properties different from each other, corresponding to arrangement positions,
said control unit includes
a measurement circuit measuring said properties of each of said plurality of elements via said plurality of connectors, and
a control circuit presuming antenna arrangement based on a measurement result of said measurement circuit and determining setting for said use state of said antenna switching unit.

3. The base station apparatus according to claim 2, wherein
said plurality of elements are resistance elements.

4. The base station apparatus according to claim 1, wherein said plurality of transmission/reception circuits comprises a first transmission/reception circuit and a second transmission/reception circuit,
wherein said antenna switching unit comprises:
a switching portion have N inputs for respectively connecting to said plurality of connectors, said switching portion having N outputs, said plurality of connectors being N in number, N being a positive even integer greater than or equal to four; and
a first connection switch having N internal switches respectively connected at one end to said N outputs of said switching portion, a first subset of said N internal switches being respectively connected at another end to said first transmission/reception circuit and a second subset of said N internal switches being respectively connected at another end to said second transmission/ reception circuit, all of said N internal switches being included in either said first subset or said second subset, but not both.

5. A base station apparatus comprising:
a plurality of connectors used for connection to a plurality of antennas respectively;
a plurality of transmission/reception circuits performing transmission/reception using said plurality of antennas; and
an antenna switching unit provided between said plurality of connectors and said plurality of transmission/reception circuits and modifying a connection relation between said plurality of connectors and said plurality of transmission/reception circuits,
wherein:
said plurality of antennas are divided into a plurality of groups, a number of which is equal to a number of said plurality of transmission/reception circuits,
said base station apparatus further comprises a control unit, and
when said antenna switching unit is at an initial state, said control unit obtains properties of said plurality of antennas via said plurality of connectors, determines to which of said plurality of groups each of said plurality of antennas should belong, based on said obtained properties, and causes a state of said antenna switching unit to make a transition from said initial state to a use state suitable for use,
wherein said control unit includes:
a transmission circuit transmitting a test radio wave using one of said plurality of antennas connected to one of said plurality of connectors as a transmission antenna,
a reception circuit receiving said test radio wave using antennas other than said transmission antenna among said plurality of antennas as a reception antenna,
a recording circuit extracting and recording information from reception signals of said test radio waves for each of said plurality of antennas from said reception circuit,
a selection control circuit giving an instruction to said antenna switching unit to sequentially switch a connector to be connected to said transmission circuit among said plurality of connectors, and
a control circuit presuming antenna arrangement from said information recorded on said recording circuit and determining setting for said use state of said antenna switching unit.

6. A base station apparatus, comprising:
a plurality of connectors used for connection to a plurality of antennas respectively;
a plurality of transmission/reception circuits performing transmission/reception using said plurality of antennas;
an antenna switching unit provided between said plurality of connectors and said plurality of transmission/reception circuits and modifying a connection relation between said plurality of connectors and said plurality of transmission/reception circuits, to correct erroneous connections that have occurred during installation work of said base station apparatus;
a test radio transmission circuit for outputting a test radio signal; and
a test radio reception circuit for receiving said test radio signal after said test radio signal has been routed through other components of said base station apparatus,
wherein
said plurality of antennas are divided into a plurality of groups, a number of which is equal to a number of said plurality of transmission/reception circuits,
said base station apparatus further comprises a control unit, and when said antenna switching unit is at an initial state, said control unit obtains properties of said plurality of antennas via said plurality of connectors, determines to which of said plurality of groups each of said plurality of antennas should belong, based on said obtained properties, and causes a state of said antenna switching unit to make a transition from said initial state to a use state suitable for use, wherein said plurality of transmission/reception circuits comprises a first transmission/reception circuit and a second transmission/reception circuit, wherein said antenna switching unit comprises:

a switching portion have N inputs for respectively connecting to said plurality of connectors, said switching portion having N outputs, said plurality of connectors being N in number, N being a positive even integer greater than or equal to four;

a first connection switch having N internal switches respectively connected at one end to said N outputs of said switching portion, a first subset of said N internal switches being respectively connected at another end to said first transmission/reception circuit and a second subset of said N internal switches being respectively connected at another end to said second transmission/reception circuit, all of said N internal switches being included in either said first subset or said second subset, but not both; and a second connection switch having N internal switches respectively connected at one end to said N outputs of said switching portion, wherein one of said N internal switches of said second connection switch is connected at another end to said test radio transmission circuit and all remaining N−1 of said N internal switches of said second connection switch being connected at another end to said test radio reception circuit.

* * * * *